(12) United States Patent
Skarlupka et al.

(10) Patent No.: US 10,793,364 B1
(45) Date of Patent: Oct. 6, 2020

(54) UNIVERSAL SORTER TRANSFER MODULE

(71) Applicant: Skarlupka Mfg., Inc., White Lake, WI (US)

(72) Inventors: Donald Bruce Skarlupka, Deerbrook, WI (US); Brian A. Zdroik, White Lake, WI (US)

(73) Assignee: SKARLUPKA MFG., INC., White Lake, WI (US)

( * ) Notice: Subject to any disclaimer, the term of this patent is extended or adjusted under 35 U.S.C. 154(b) by 0 days.

(21) Appl. No.: 16/842,008

(22) Filed: Apr. 7, 2020

Related U.S. Application Data

(60) Provisional application No. 62/884,926, filed on Aug. 9, 2019.

(51) Int. Cl.
| | |
|---|---|
| *B65G 17/08* | (2006.01) |
| *B65G 17/24* | (2006.01) |
| *B65G 39/12* | (2006.01) |
| *B65G 23/02* | (2006.01) |
| *B65G 39/02* | (2006.01) |

(52) U.S. Cl.
CPC ........... *B65G 17/083* (2013.01); *B65G 17/24* (2013.01); *B65G 23/02* (2013.01); *B65G 39/025* (2013.01); *B65G 39/12* (2013.01)

(58) Field of Classification Search
CPC ...... B65G 17/083; B65G 17/24; B65G 23/02; B65G 39/025; B65G 39/12
USPC ....................................... 198/779, 833, 842
See application file for complete search history.

(56) References Cited

U.S. PATENT DOCUMENTS

| | | | |
|---|---|---|---|
| 3,550,756 A | 12/1970 | Kornylak | |
| 3,858,473 A * | 1/1975 | Bystron | B26D 7/20 83/401 |
| 3,964,588 A | 6/1976 | Kornylak | |
| 3,967,720 A * | 7/1976 | Arieh | B65G 23/16 198/833 |
| 5,238,099 A | 8/1993 | Schroeder et al. | |
| 5,240,102 A * | 8/1993 | Lucas | B65G 13/10 198/456 |
| 5,411,279 A * | 5/1995 | Magid | A47D 13/043 198/833 |
| 6,152,854 A * | 11/2000 | Carmein | A63B 22/025 482/4 |
| 6,540,060 B1* | 4/2003 | Fargo | B66B 23/02 198/326 |
| 6,758,323 B2 | 7/2004 | Costanzo | |

(Continued)

OTHER PUBLICATIONS

"Plastic Modular Belt Series uni QNB Type Ball," Ammeraal Beltech, Sep. 11, 2019.

(Continued)

*Primary Examiner* — Mark A Deuble
(74) *Attorney, Agent, or Firm* — Steinnon & Steinnon

(57) ABSTRACT

A transfer module for a universal sorting conveyor has a ball belt looped around two pulley assemblies mounted to a frame and driven in a machine direction. Two bi-directional cross-belt assemblies are mounted to the frame to provide two smooth surfaced belts each supported on a roller bed. The belts extend beneath and engage the ball belt to advance a conveyed parcel in the cross direction. Each cross belt assembly has drive rollers at the ends and a multiplicity of closely spaced idler rollers of smaller diameter than the drive rollers which define the roller bed.

20 Claims, 6 Drawing Sheets

(56) References Cited

U.S. PATENT DOCUMENTS

| | | | |
|---|---|---|---|
| 6,883,659 B2 | 4/2005 | Muchalov | |
| 7,021,454 B2 * | 4/2006 | Ozaki | B65G 17/24 |
| | | | 193/35 MD |
| 7,147,097 B2 | 12/2006 | Lemm | |
| 7,237,670 B1 | 7/2007 | Ryan | |
| 7,249,669 B2 | 7/2007 | Fourney | |
| 7,284,653 B2 | 10/2007 | Fourney et al. | |
| 7,344,018 B2 | 3/2008 | Costanzo et al. | |
| 7,588,137 B2 | 9/2009 | Fourney | |
| 8,172,069 B2 | 5/2012 | Prakasam | |
| 8,915,353 B2 * | 12/2014 | Fourney | B65G 17/24 |
| | | | 198/779 |
| 9,156,629 B2 | 10/2015 | Costanzo et al. | |
| 2008/0023301 A1 | 1/2008 | Fourney | |
| 2018/0257110 A1 | 9/2018 | Lundahl et al. | |
| 2018/0257872 A1 * | 9/2018 | Kuhn | B65G 47/46 |

OTHER PUBLICATIONS

"uni QNB Ball Technical Manual," Ammeraal Beltech, Jan. 2018. See p. 6, Fig. 8, re grooved closed carry bed.

"uni QNB Ball: Superior Performance in All Directions," Ammeraal Beltech, Feb. 2017.

"Conveyor Products Catalog: Edition 2," Dotmar Engineering Plastics Limited, pp. 1, 28-30, Jan. 2016. "System Plast TM Unit Material Handling Conveyor Solutions," Regal-Beloit Corporation, 2015.

"Designed for Diversity: Multidirectional Roller Top Belt Series 2253 RT: Appendix to General Engineering Manual," Regal-Beloit Corporation, 2016.

"System Plast TM: Unit Material Handling Conveyor Solutions," Regal-Beloit Corporation, 2015.

* cited by examiner

UNIVERSAL SORTER TRANSFER MODULE

CROSS REFERENCES TO RELATED APPLICATIONS

This application claims the benefit of priority of U.S. provisional App. No. 62/884,926, filed Aug. 9, 2019, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to conveyors generally, and more particularly to sortation modules for conveyors which can divert conveyed products in a desired manner.

Ball belt conveyors employ a modular belt comprised of pin-connected modular plastic links. Each link incorporates a linear array of freely rotating balls. When the ball belt passes over a fixed support area, the balls are caused to rotate, and the conveyed product is advanced at a speed greater than the speed of the belt. By placing two parallel auxiliary belts beneath the ball belt in contact with the balls, and running the belts in directions perpendicular to the ball belt's travel, the product can be diverted in a direction perpendicular to the ball belt travel direction. In conventional conveyors, the auxiliary belts are sometimes supported on fixed wear strips. However, with heavier packages and wider cross-direction expanses, the friction between the auxiliary belts and the wear strips can be excessive and can impede conveyor operation.

What is needed is a conveyor arrangement which will allow significant cross-direction widths with heavier conveyed objects.

SUMMARY OF THE INVENTION

A universal sorting conveyor transfer module has a ball belt looped around two pulley assemblies mounted to a frame and driven in a machine direction. One or two bi-directional cross-belt assemblies are mounted to the frame to provide smooth surfaced belts which extend beneath the ball belt and which, when activated, move the balls of the ball belt to advance a conveyed product in the cross direction. Each cross belt assembly has drive rollers at the ends and a multiplicity of closely spaced idler rollers of smaller diameter than the drive rollers which define a roller bed. Each cross belt extends beneath the ball belt so as to engage the plurality of balls of the ball belt, such that when the cross belt is driven in the cross machine direction, an object supported on the ball belt is conveyed in the cross direction.

It is an object of the present invention to provide a conveyor arrangement utilizing a ball belt which will allow significant cross-direction widths with heavy conveyed objects.

Further objects, features and advantages of the invention will be apparent from the following detailed description when taken in conjunction with the accompanying drawings.

DESCRIPTION OF THE PREFERRED EMBODIMENTS

Figure 1:
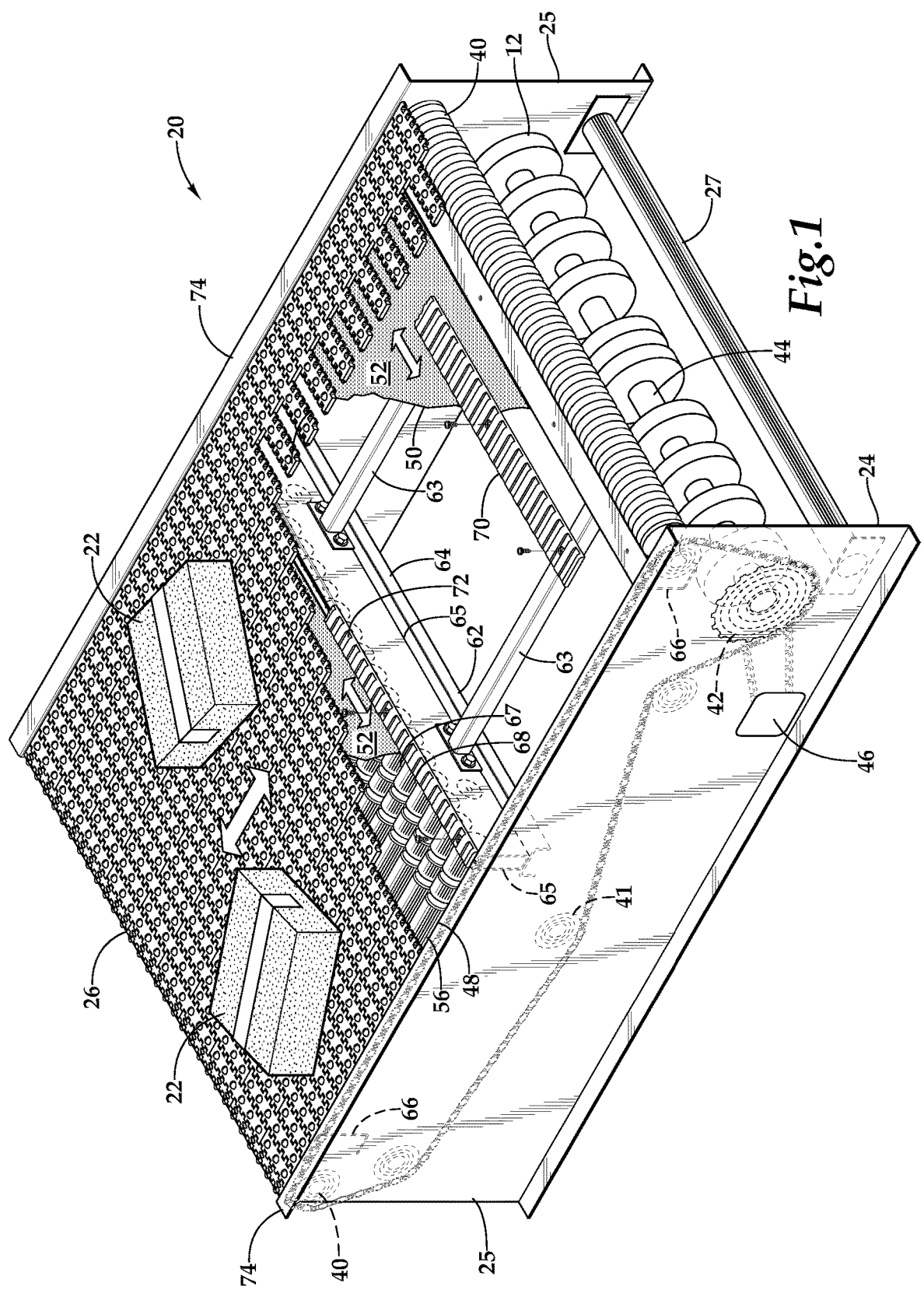
FIG. 1 is a fragmentary isometric view broken away in section of the conveyor arrangement of this invention.

Referring more particularly to FIGS. 1-9, wherein like numbers refer to similar parts, a conveyor arrangement 20 is shown in FIG. 1 which can serve as a universal sorter module within a larger conveyor system. The conveyor arrangement 20 may be operated to convey objects 22, such as a corrugated cardboard carton, in a machine direction, a counter-machine direction, or in a cross-machine direction to one side or the other.

Figure 4:
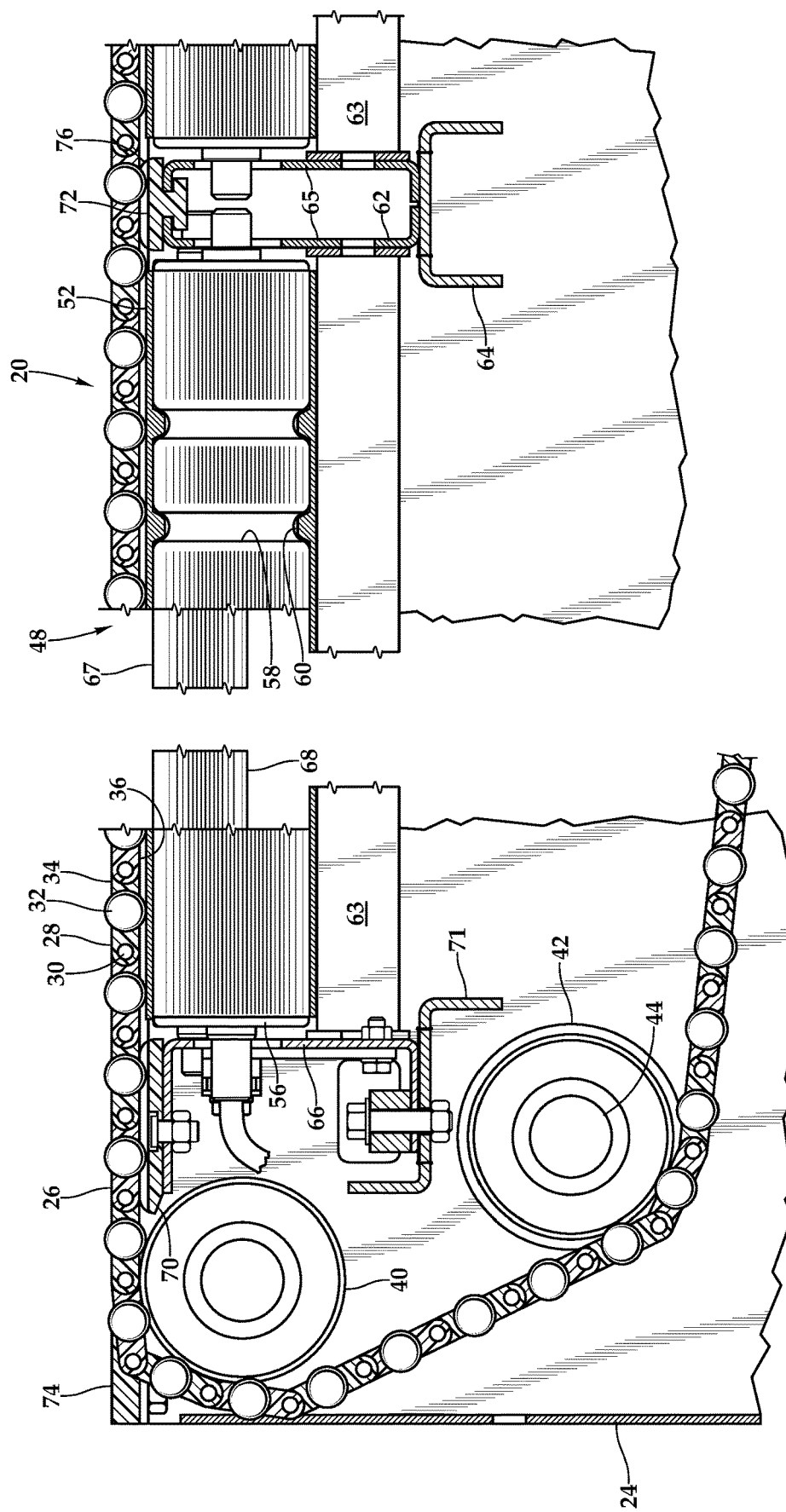
FIG. 4 is fragmentary cross-sectional view of the conveyor arrangement of FIG. 2 taken along section line 4-4.

The conveyor arrangement 20 has a frame 24 which extends to engage some support surface such as the floor. The frame 24 has side members 25 connected by cross members 27, 64. A ball belt 26 is mounted to the frame 24 for advancement in a machine direction. The ball belt 26 may be the uni QNB ball belt, available from Ammeraal Beltech Holding B.V. P.O. Box 38, 1700 AA Heerhugowaard, The Netherlands. The ball belt 26 is comprised of multiple modular plastic links 28. As shown in FIG. 4, the links 28 are pivotably connected by pins 30. A plurality of freely rotating balls 32 are mounted to the links. Each link has a link body 34 with a lower surface 36. The balls 32 extend beneath the lower surface 36 where they may be engaged by an underlying element and be rotated to advance the article supported on the ball belt 26. As shown in FIG. 1, the ball belt 26 passes over pulley assemblies 40 on cross axles mounted to the frame 24, including a take-up pulley assembly 41 which may have a spring-loading apparatus (not shown). The ball belt 26 is engaged by a number of sprockets 42 mounted to a cross axle 44 supported on the frame 24. (In FIGS. 1 and 4 for simplicity, some of the sprockets are shown as circular outlines, omitting the individual teeth of the sprockets.) The pulleys of the pulley assemblies 40 and the sprockets 42 are provided with appropriate relief so that the modular links 28 may be engaged while having clearance for the balls 32. The cross axle 44 is driven by a drive motor 46. The motor 46 drives the ball belt 26 in a machine direction either forward or in reverse.

Figure 2:
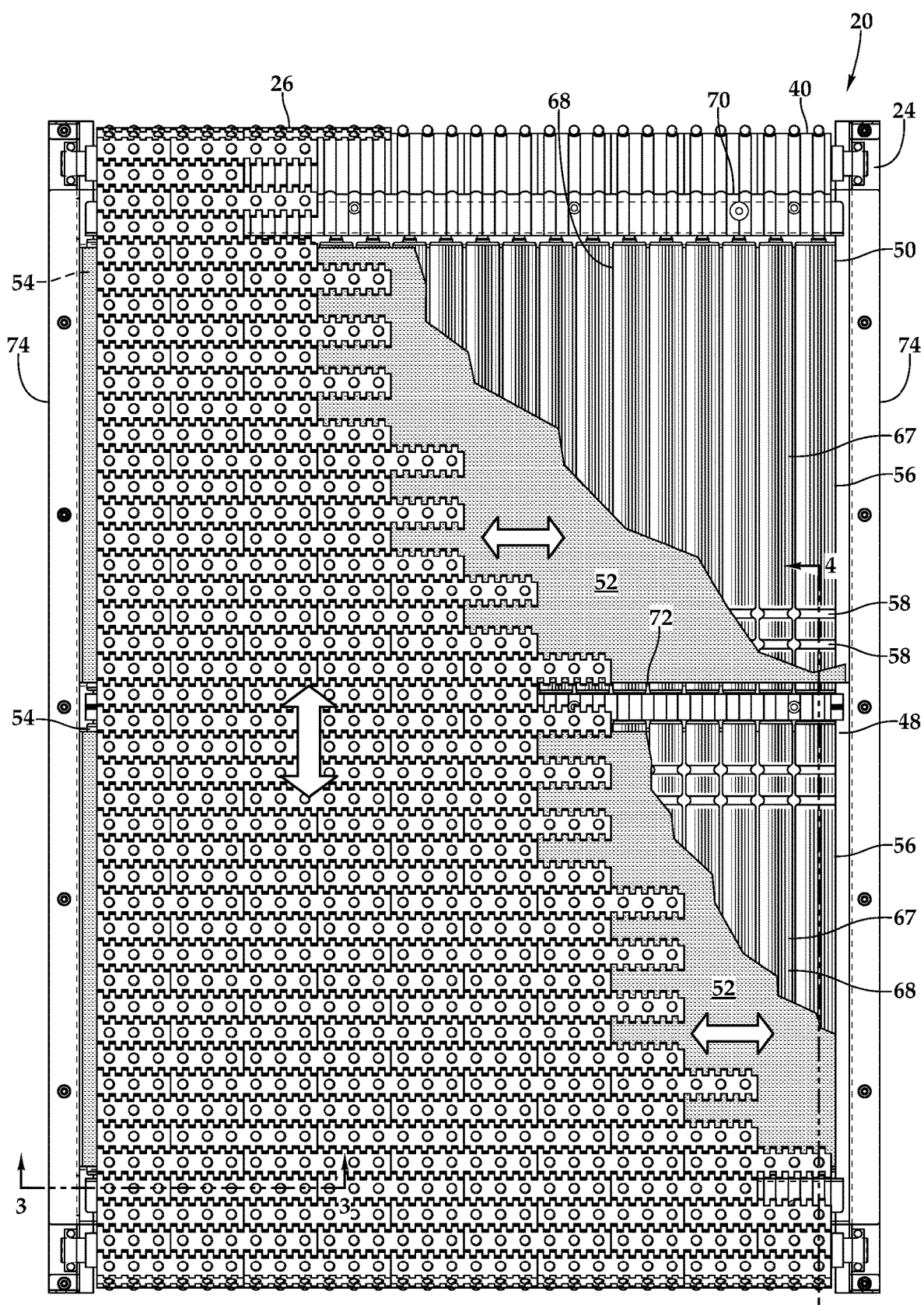
FIG. 2 is a top plan view, partially broken away in section, of the conveyor arrangement of FIG. 1.
Figure 3:
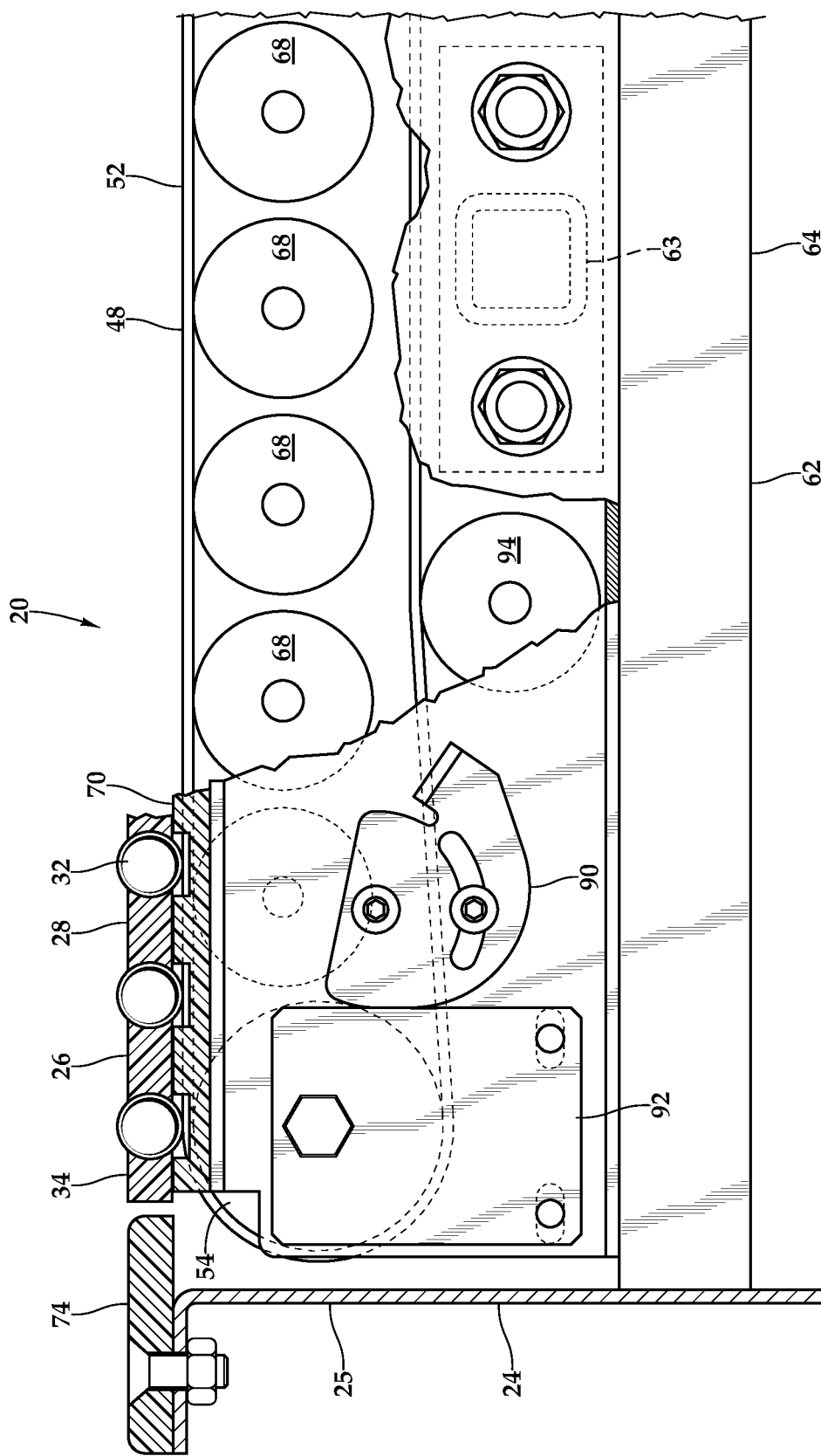
FIG. 3 is a fragmentary cross-sectional view of the conveyor arrangement of FIG. 2 taken along section line 3-3.

As shown in FIG. 2, two bi-directional cross belt assemblies 48, 50 are mounted to the frame 24 to extend in the cross-machine direction immediately below the ball belt 26. Each of the cross belt assemblies 48, 50 has a smooth surface monofilament PVC belt 52 which loops around a first drive roller 54 and a second drive roller 56. The belt 52 is an endless belt with a finger splice belt seam. The drive rollers 54, 56 of a particular cross belt assembly are synched so that both drive a belt simultaneously and can serve to drive the belt in forward or reverse. The drive rollers 54, 56 have grooves 58 which receive V-protrusions 60 which extend inwardly from the looped belt 52 so as to retain the belt in position. The drive rollers 54, 56 may be, for example, 1.9 inches in diameter, and mounted by sealed ball bearings to a subframe 62. The frame 24 has a central element 64 which is an inverted U-channel extending between the side members 25. The subframe 62 for each cross belt assembly 48, 50 has two side elements 65, 66 which are each U-channel members. The side elements 66 are mounted to cross members 71 of the frame 24 near the roller belt pully assemblies 40, while the side elements 65 are mounted to the frame central element 64. Intermediate subframe members 63 extend between the side elements 65, 66 of each subframe 62, as shown in FIG. 1. As shown in FIG. 3, the cross belt assemblies 48, 50 may be provided with a belt-tensioning cam 90 mounted to one of the subframe side elements 65, 66 to urge a plate 92 to which a drive roller 54, 56 is mounted, thereby providing a mechanism to adjust the tension of the belts 52. The return runs of the belts 52 pass over an outside roller 94.

Although not shown, the subframe 62 may be a removable arrangement which sits in the bed of the frame 24, with a knob which fastens the subframe in place, but which allows the entire subframe and cross belt assembly to be removed for servicing.

Each belt 52 travels within a cross belt assembly over a roller bed 67 defined by closely spaced idler rollers 68. Each cylindrical idler roller 68 is mounted at both ends by ABEC 1 sealed ball bearing cartridges which are swedged to cylindrical tubes forming the roller surfaces. The bearings are supported on hex stub shafts which are mounted to the auxiliary conveyor subframe central element 65 and side element 66. The two U-channel central elements 65 face one another and are fixed to the frame cross member 64 as shown in FIG. 4. The idler rollers also have grooves positioned to receive the V protrusions 60 on the belt. The idler rollers 68 are significantly smaller in diameter than the driver rollers 54, 56, for example, with drive rollers of 1.9 inches in diameter, the idler rollers may be 1⅜ inches in diameter, hence the idler rollers are less than ¾ of the diameter of the drive rollers. The spacing between the idler rollers may be about ⅛ inch. The horizontal axes about which the idler rollers turn are more than ⅛ inch above the horizontal axes about which the drive rollers 54, 56 turn. The smaller diameter idler rollers 68 permit more idler rollers to be positioned beneath a belt 52 to provide adequate support for the ball belt 26 which passes over the belt 52 and which carries a conveyed object 22. As shown in FIG. 2, the roller beds 67 defined by each of the cross belt assemblies 48, 50 can extend 30 inches in the cross direction without inordinate friction, even while supporting significant weight of a conveyed object, even ones weighing 100 pounds. Moreover, the wide expanse of the conveyor arrangement 20, although it can support objects as small as 6"×6"×½", can also accommodate cartons as large as 36"×24"×18". Product within these limitations can be conveyed, including cartons, boxes, parcels, pouches, and bulk mail sacks.

The cross belts 52 are supported by the idler roller beds 67, and even though the cross belts 52 are not supported directly by a roller at every point, the close spacing and narrow diameter of the idler rollers and the bridging of the belt between the crowns of the idler rollers results in a conveying arrangement which adequately drives the balls of the ball belt while given adequate support to heavier conveyed objects 22.

Figure 7:
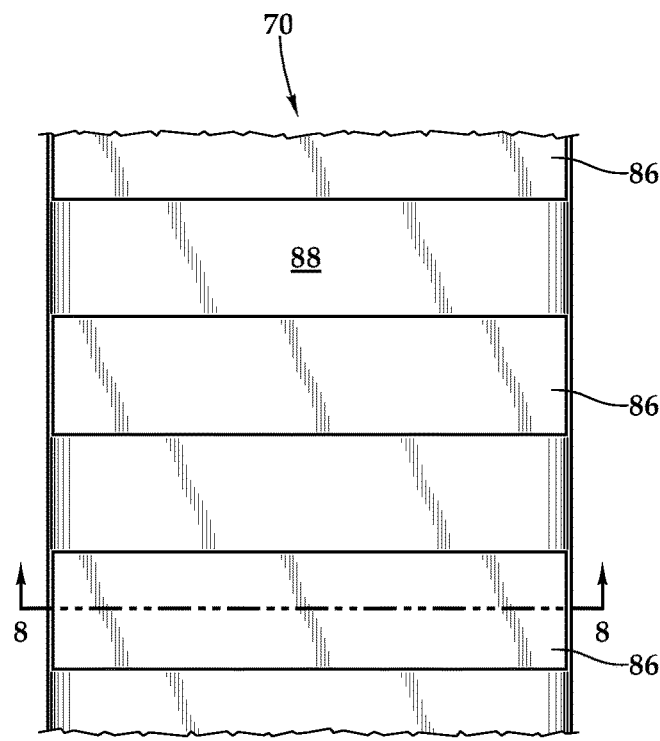
FIG. 7 is a fragmentary top plan view of an end glide plate of the conveyor arrangement of FIG. 1.
Figure 8:
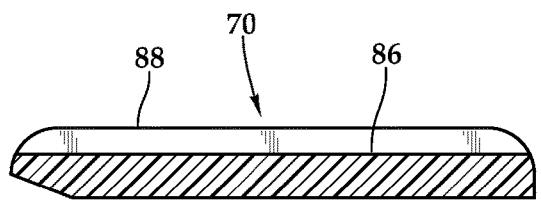
FIG. 8 is a cross-sectional view of the end glide plate of FIG. 7 taken along section line 8-8.

As shown in FIGS. 3 and 4, glide plates may be provided at transitions within the conveyor arrangement. End glide plates 70 are mounted to the side elements 66 of the subframe 62 of the two cross belt assemblies 48, 50 to support the ball belt 26 in the gaps between the edges of a cross belt assembly and a belt pulley assembly 40. As shown in FIGS. 7 and 8, each end glide plate 70 has a plurality of machine direction slots 86 relieved below the glide plate upper surface 88 such that the balls 32 mounted to the link bodies 31 pass through the glide plate slots without engaging the glide plate. The end glide plates 70 are radiused to ease the entry of the link bodies 31 onto the glide plates. As shown in FIGS. 4 and 8, the undersides of the end glide plates 70 are cut away to allow the glide plates to be positioned more closely to the drive sprockets 42 without engaging them.

Figure 5:
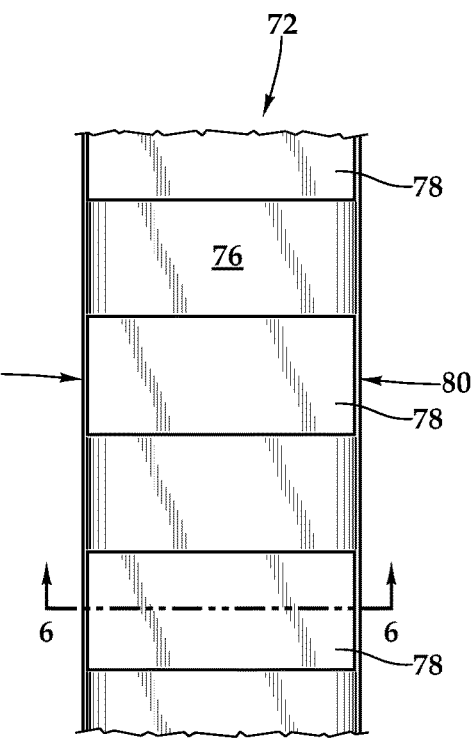
FIG. 5 is a fragmentary top plan view of an intermediate glide plate of the conveyor arrangement of FIG. 1.
Figure 6:
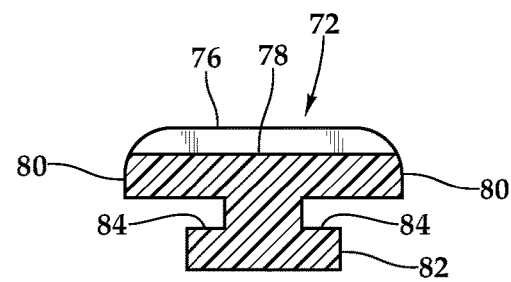
FIG. 6 is a cross-sectional view of the intermediate glide plate of FIG. 5 taken along section line 6-6.
Figure 9:
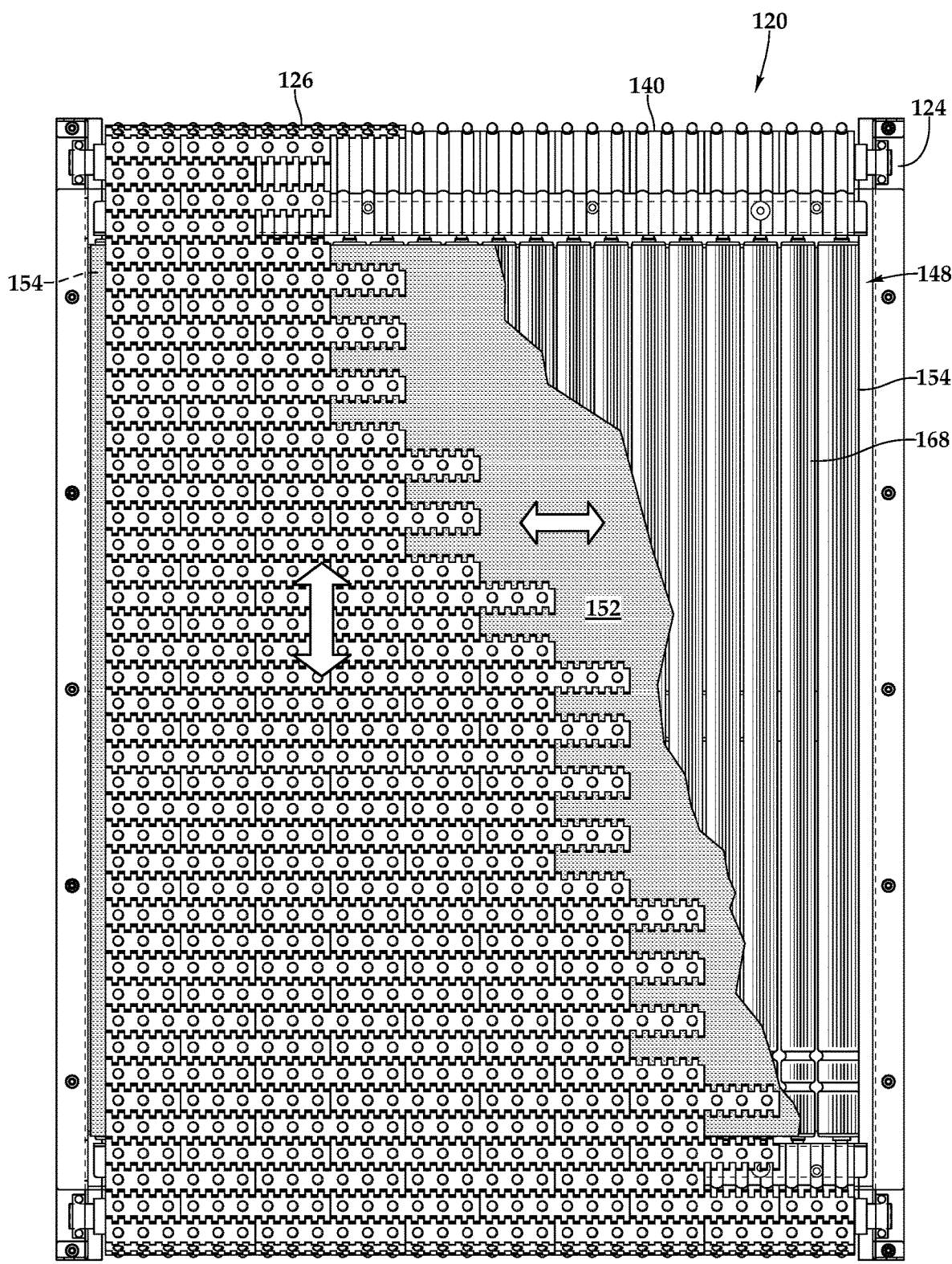
FIG. 9 is a top plan view, partially broken away in section, of an alternative embodiment conveyor arrangement of this invention having a single cross belt conveyor.

A central glide plate 72 is mounted to the central element 64 of the subframe 62 to bridge the gap between the two cross belt assemblies 48, 50. As shown in FIGS. 5 and 6, the central guide plate 72 has an upper surface 76 positioned to engage the lower surfaces 36 of the link bodies 34 of the ball belt. The central guide plate 72 has a plurality of machine direction slots 78 relieved below the glide plate upper surface 76 such that the balls 32 mounted to the link bodies 31 pass through the glide plate slots without engaging the glide plate. The slots 78 extend between parallel faces 80 of the glide plate and the glide plate is radiused between each of the parallel faces and the glide plate upper surface 76, as shown in FIG. 6, easing the link bodies onto the upper surface of the glide plate as they move across the glide plate 72. The central guide plate 72 is provided with an inverted T-shaped element 82 which defines two parallel slots which engage with the U-channel members 65 of the central element 64 of the subframe 62.

The end and central glide plate upper surfaces are at the same height as the upper surface of the cross belts 52. As shown in FIGS. 1 and 3, side glide plates 74 are mounted to the side members 25 of the conveyor frame. The side glide plates 74 may be formed of UHMW and have an upper surface which is about even with the upper surfaces of the modular links 28 of the ball belt 26.

In operation, the conveyor arrangement 20 serves as a transfer module for a universal sorter assembly. It may receive input conveyed objects going in the machine direction, and, with the cross belt assemblies 48, 50 stationary, the objects will continue along the ball belt in the machine direction to leave the conveyor arrangement 20. Either one of the cross belt assemblies 48, 50 may be activated to move the conveyed object 22 in the cross direction to either side of the conveyor. Moreover, with one cross belt assembly driven in one direction, and the other cross belt assembly driven in the other, a conveyed object 22 can be rotated about a vertical axis as it is conveyed along the ball belt 26 so as to present a different orientation when it leaves the conveyor.

An alternative embodiment conveyor arrangement 120 is similar to the conveyor 20, but has only a single cross belt assembly. The conveyor arrangement 120 has a frame 124 with a ball belt 126 mounted to the frame 124 for advancement in a machine direction. The ball belt 126 passes over pulley assemblies 140 on cross axles mounted to the frame 124. The ball belt 126 is engaged by a number of sprockets (not shown) mounted to a cross axle supported on the frame 124. The cross axle is driven by a motor (not shown) which drives the ball belt 126 in a machine direction either forward or in reverse. The conveyor arrangement 120 has a single bi-directional cross belt assembly 148 mounted to the frame 124 to extend in the cross-machine direction immediately below the ball belt 26. The cross belt assembly 148 has a smooth surface monofilament PVC belt 152 which loops around end drive rollers 154 and intermediate idler rollers of smaller diameter, as in the arrangement 20.

It is understood that the invention is not limited to the particular construction and arrangement of parts herein illustrated and described, but embraces all such modified forms thereof as come within the scope of the following claims.

We claim:

1. A conveyor arrangement comprising:
   a frame;
   two first rolls mounted to the frame;
   a ball belt looped around the two first rolls, the ball belt having a plurality of freely spinning balls mounted thereto to project upwardly to engage an object it is desired to convey;
   a drive engaged with the ball belt to advance the ball belt in a machine direction;
   a subframe mounted to the frame extending beneath the ball belt;
   a first drive roller of a first diameter mounted to the subframe beneath the ball belt;
   a plurality of closely spaced idler rollers of a second diameter mounted to the subframe beneath the ball belt to define a roller bed together with the first drive roller, the idler rollers being spaced about ⅛ inch apart; and
   a cross belt looped around the first drive roller and the plurality of idler rollers to be driven by the first drive roller in a cross machine direction which is perpendicular to the machine direction, wherein the cross belt is supported on the roller bed and extends beneath the ball belt so as to engage the plurality of balls of the ball belt passing thereover, such that when the cross belt is driven in the cross machine direction, an object supported on the ball belt is conveyed in a direction perpendicular to the machine direction.

2. The conveyor arrangement of claim 1 further comprising:
   a second drive roller of a third diameter mounted to the subframe beneath the ball belt;
   a plurality of second idler rollers of a fourth diameter mounted to the subframe beneath the ball belt to define a second roller bed; and
   a second cross belt looped around the second drive roller and the plurality of second idler rollers to be driven by the second drive roller in a cross machine direction which is perpendicular to the machine direction, wherein the second cross belt extends beneath the ball belt and is supported on the second roller bed so as to engage the plurality of balls of the ball belt, such that when the second cross belt is driven in the cross machine direction, an object supported on the ball belt is conveyed in a direction perpendicular to the machine direction.

3. The conveyor arrangement of claim 1 wherein the second diameter is significantly less than the first diameter.

4. The conveyor arrangement of claim 3 wherein the second diameter is less than three quarters of the first diameter.

5. The conveyor arrangement of claim 1 wherein the looped cross belt is an endless belt with a finger splice belt seam.

6. The conveyor arrangement of claim 1 further comprising a V-protrusion which extends from the looped cross belt, and wherein the first drive roller has a groove which receives the V-protrusion.

7. A conveyor arrangement comprising:
   a frame;
   a ball belt mounted to the frame to define a looped belt run, the ball belt having a plurality of freely spinning balls mounted thereto to project upwardly to engage an object it is desired to convey and to project downwardly;
   a drive engaged with the ball belt to advance the ball belt in a machine direction; and
   a first cross belt assembly mounted to the frame within the looped ball belt, the first cross belt assembly having a first cross belt which is looped about two end rollers, wherein at least one of the end rollers is a first drive roller, and wherein a plurality of idler rollers are mounted within the looped first cross belt to define a first roller bed over which the first cross belt travels, wherein the first drive roller has a diameter, and wherein the idler rollers are spaced from each other a distance which is less than ⅕ of the first drive roller diameter, and wherein the first cross belt is driven by the first drive roller to move in a cross machine direction which is perpendicular to the machine direction, wherein the first cross belt is supported on the first roller bed and extends beneath the ball belt so as to engage the plurality of balls of the ball belt passing thereover, such that when the first cross belt is driven in the cross machine direction, an object supported on the ball belt is conveyed in a direction perpendicular to the machine direction.

8. The conveyor arrangement of claim 7 further comprising a second cross belt assembly mounted to the frame within the looped ball belt and downstream in the machine direction from the first cross belt assembly, the second cross belt assembly having a second cross belt which is looped about two end rollers, at least one of which is a second drive roller, and wherein a plurality of idler rollers are mounted within the looped second cross belt to define a second roller bed over which the second cross belt travels, the second cross belt being driven by the second drive roller to move in the cross machine direction, wherein the second cross belt is supported on the second roller bed and extends beneath the ball belt so as to engage the plurality of balls of the ball belt passing thereover, such that when the second cross belt is driven in the cross machine direction, an object supported on the ball belt is conveyed in a direction perpendicular to the machine direction.

9. The conveyor arrangement of claim 8 wherein the ball belt has a plurality of links with a link body having a lower surface and at least one ball mounted thereto to extend beneath the lower surface, and further comprising a glide plate mounted to the frame between the first cross belt assembly and the second cross belt assembly within the looped ball belt, the glide plate having an upper surface positioned to engage the lower surfaces of the link bodies of the ball belt, and the glide plate having a plurality of machine direction slots relieved below the glide plate upper surface such that the balls mounted to the link bodies pass through the glide plate slots without engaging the glide plate.

10. The conveyor arrangement of claim 9 wherein the glide plate machine direction slots extend between parallel faces of the glide plate, and the glide plate defines a radius between each of the parallel faces and the glide plate upper surface.

11. The conveyor arrangement of claim 7 wherein the at least one drive roller has a first diameter, and wherein the idler rollers have a diameter which is substantially less than the first diameter.

12. The conveyor arrangement of claim 11 wherein the idler rollers have a diameter which is less than three quarters of the first diameter.

13. A conveyor comprising:
a looped ball belt having a plurality of balls mounted thereto for rotation, the looped ball belt being driven in a machine direction; and
a first cross belt assembly disposed within the looped ball belt, the first cross belt assembly having two end rollers with a flat belt looped about the two end rollers and driven in a cross machine direction and a plurality of idler rollers disposed within the looped flat belt, the idler rollers positioned to engage the flat belt against the balls of the ball belt passing thereover the looped ball belt and first cross belt assembly being drivable to advance an article supported on the ball belt in a desired direction;
a second cross belt assembly disposed within the looped ball belt, the second cross belt assembly having two second end rollers with a second flat belt looped about the two second end rollers and driven in a cross machine direction and a plurality of second idler rollers disposed within the looped flat belt, the second idler rollers positioned to engage the second flat belt against the balls of the ball belt passing thereover,
wherein the ball belt has a plurality of links with a link body having a lower surface and at least one ball mounted thereto to extend beneath the lower surface, and further comprising a glide plate mounted within the ball belt between the first cross belt assembly and the second cross belt assembly within the looped ball belt, the glide plate having an upper surface positioned to engage the lower surfaces of the link bodies of the ball belt, and the glide plate having a plurality of machine direction slots relieved below the glide plate upper surface such that the balls mounted to the link bodies pass through the glide plate slots without engaging the glide plate.

14. The conveyor arrangement of claim 13 wherein the glide plate machine direction slots extend between parallel faces of the glide plate, and the glide plate defines a radius between each of the parallel faces and the glide plate upper surface.

15. A conveyor comprising:
a looped ball belt having a plurality of balls mounted thereto for rotation, the looped ball belt being driven in a machine direction; and
a first cross belt assembly disposed within the looped ball belt, the first cross belt assembly having two end rollers with a flat belt looped about the two end rollers and driven in a cross machine direction and a plurality of idler rollers having a diameter and disposed within the looped flat belt, wherein a spacing between the idler rollers is about $\frac{1}{11}$ the idler roller diameter, the idler rollers positioned to engage the flat belt against the balls of the ball belt passing thereover, the looped ball belt and first cross belt assembly being drivable to advance an article supported on the ball belt in a desired direction.

16. The conveyor of claim 15 further comprising a second cross belt assembly disposed within the looped ball belt, the second cross belt assembly having two second end rollers with a second flat belt looped about the two second end rollers and driven in a cross machine direction and a plurality of second idler rollers disposed within the looped flat belt, the second idler rollers positioned to engage the second flat belt against the balls of the ball belt passing thereover.

17. The conveyor arrangement of claim 15 wherein the end rollers have a first diameter, and wherein the idler rollers have a diameter which is substantially less than the first diameter.

18. The conveyor arrangement of claim 17 wherein the idler rollers have a diameter which is less than three quarters of the first diameter.

19. The conveyor arrangement of claim 15 wherein the looped flat belt is an endless belt with a finger splice belt seam.

20. The conveyor arrangement of claim 15 further comprising a V-protrusion which extends inwardly from the looped flat belt, and wherein the two end rollers have grooves which receive the V-protrusion.

* * * * *